June 16, 1964 R. L. SNYDER 3,137,845

HIGH DENSITY SHIFT REGISTER

Filed July 2, 1962 5 Sheets-Sheet 1

INVENTOR.
RICHARD L. SNYDER,
BY
Walter J. Adam
ATTORNEY.

INVENTOR.
RICHARD L. SNYDER.
BY
Walter J. Adam
ATTORNEY.

June 16, 1964 R. L. SNYDER 3,137,845

HIGH DENSITY SHIFT REGISTER

Filed July 2, 1962 5 Sheets-Sheet 3

INVENTOR.
RICHARD L. SNYDER,
BY
Walter J. Adam
ATTORNEY.

June 16, 1964 R. L. SNYDER 3,137,845

HIGH DENSITY SHIFT REGISTER

Filed July 2, 1962 5 Sheets-Sheet 4

INVENTOR.
RICHARD L. SNYDER,
BY
Walter J. Adam
ATTORNEY.

INVENTOR.
RICHARD L. SNYDER,
BY
Walter J. Adam
ATTORNEY.

United States Patent Office 3,137,845

Patented June 16, 1964

3,137,845

HIGH DENSITY SHIFT REGISTER

Richard L. Snyder, Malibu, Calif., assignor to Hughes Aircraft Company, Culver City, Calif., a corporation of Delaware Filed July 2, 1962, Ser. No. 206,983
8 Claims. (Cl. 340—174)

This invention relates to magnetic information retaining devices and particularly a system for storing magnetic informational domains within elongated magnetic mediums with a large concentration of information in a relatively small space and length of medium.

In digital computer operation, permanent storage of a great number of binary information bits is required as well as temporary internal storage within the computer. Conventional storage means include rotating magnetic drums and moving magnetic tape or wire devices which have the disadvantages of requiring mechanical motion and of being relatively large in dimensions for storage of a substantial amount of information. Storage systems utilizing the principle of establishing and shifting magnetic domains of selected polarities through a magnetic medium have the advantages of being mechanically static, highly reliable and greatly simplified. In some magnetic shift register arrangements, the magnetic domains formed in the medium or wire have boundaries or poles at which flux leaves the wire to return through a non-magnetic medium to the other boundaries of the domain. The wire is most conveniently arranged as a helix around a cylindrically disposed polyphase advancing array. Adjacent loops of the helix may have like polarized domains with fields returning through the non-magnetic medium surrounding the wires providing interference with each other. In these arrangements, the magnetized wires must be spaced at sufficient distance from one another to prevent interaction of this returning flux from altering the intended magnetic patterns. Also, because of the flux spreading or passing through a non-magnetic medium such as air, each magnetic domain is required to be of a length which is relatively long because of the magnetomotive force required to support the flux in the non-magnetic medium.

It is therefore an object of this invention to provide a magnetic shift register system in which the magnetic domains are relatively short and the magnetic mediums are closely spaced to store a relatively large amount of information in a small space.

It is a further object of this invention to provide a magnetic shift register storage system utilizing two magnetic mediums in which complementary magnetic domains are formed and propagated.

It is another object of this invention to provide a shift register storage system which stores a binary bit in two oppositely magnetized wires to provide an essentially closed magnetic circuit.

It is still another object of this invention to provide a shift register system that utilizes two magnetic wires in each channel to provide an essentially closed magnetic path for each domain so as to be substantially unaffected by fields emanating from other regions.

Briefly, in accordance with this invention, polyphase conductors are arranged in ribbons, for example, with a first and a second magnetic wire arranged on opposite sides thereof in a pair. Recording and reading coil means are provided between the magnetic wires substantially at opposite ends thereof. Complementary domains or domains of opposite polarity representing binary information are established in the first and second magnetic wires by the recording means and are propagated therealong to be sensed by the reading means. Thus, the magnetic field of each domain is essentially in a closed magnetic loop through the first and second magnetic wires to provide a relatively high informational density along the wires and to provide an arrangement in which various portions of the pair of magnetic wires may be closely spaced. Also, because the length of each magnetic domain is relatively short, a fast rate of recording and reading binary information is provided.

The novel features of this invention, as well as the invention itself, both as to its organization and method of operation, will best be understood from the accompanying description taken in connection with the accompanying drawings, in which like characters refer to like parts, and in which.

Figures 1, 2:
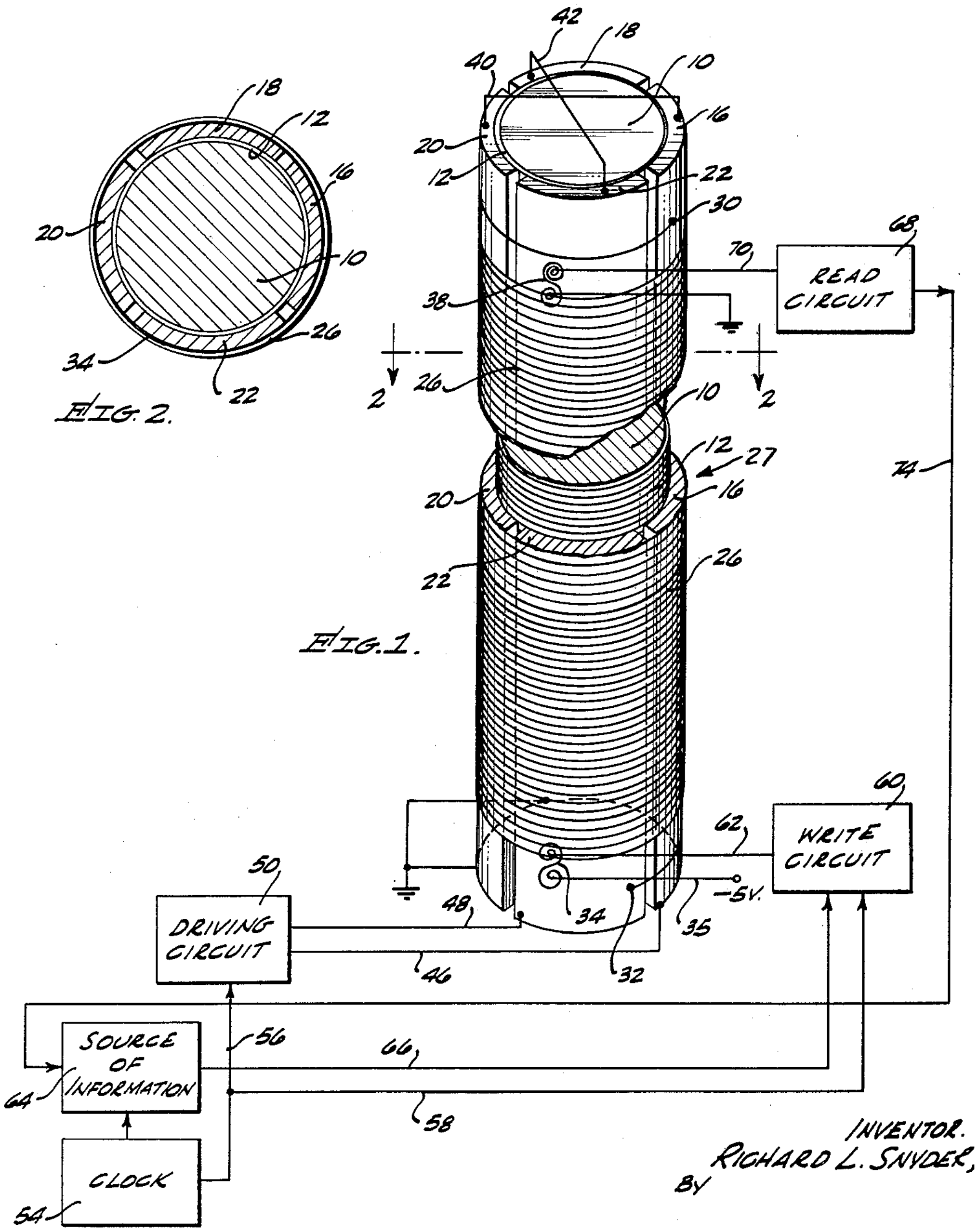
FIG. 1 is a schematic partially perspective drawing showing the shift register memory system in accordance with this invention.
FIG. 2 is a section taken at line 2—2 of FIG. 1 for explaining the arrangement of the driving conductors and magentic wires in accordance with this invention.

Referring first to the partially perspective drawing of FIG. 1 and to the section of FIG. 2, an arrangement in accordance with this invention includes a non-conductive mounting cylinder 10 having a first magnetic wire 12 wound thereon in a close spaced helix, that is, a helix with a small pitch. On top of the magnetic wire 12, four conductors 16, 18, 20 and 22 are placed which may be ribbons of insulated conducting material such as anodized aluminum to form the polyphase conductor array. The conductors 16, 18, 20 and 22 which are evenly spaced, insulated, and separated from each other are placed parallel to the longitudinal axis of the cylinder 10 or for convenience of mounting may form a very long pitch helix. As shown on FIG. 2, the conductors 16, 18, 20 and 22 are curved to conform to the circular configuration of the structural cylinder 10. It is to be noted at this time that in accordance with the polyphase driving arrangement of this invention, polyphase conductors of any multiple of 4 may be utilized.

Outside and adjacent to the four conductors 16, 18, 20 and 22 is wound a helix of a second magnetic wire 26 having the same pitch as the wire 12 and being opposite in position from the wire 12 along the axis of the cylinder 10. The wires 12 and 26 form a combined wire or channel 27. The magnetic wire 26 may be mounted firmly against two conductors as shown in FIG. 2. It is to be noted that the correspondence of position between the two magnetic wires 12 and 26 is not critical so long as the pitch of the windings are identical. It is only necessary that corresponding segments of the magnetic wires 12 and 26 are reasonably near to one another in a longitudinal sense along the axis of the cylinder 10. However, it is desirable that corresponding segments of the wires 12 and 26 be less than half a pitch spacing from one another in the axial sense of the mounting cylinder 12.

The magnetic wires 12 and 26 are each maintained under a tension in accordance with this invention to provide reliable formation and propagation of domains therein. For example, the wire 26 may be firmly mounted at points 30 and 32 by suitable fastening means with the proper tension. It has been found that by maintaining the magnetic wires such as 12 and 26 under a tension within 80 percent of their yield point (elastic limit) highly desirable operation characteristics are provided at a relatively fast frequency of operation. Also, it has been found that a wide range of variation of tension is allowable while still providing desirable operating characteristics. For very high frequency operation, that is a very high rate of applying polyphase driving pulses, the most desirable tension has been found to be closer to 50 percent of the elastic limit. However, when lower frequencies of operation are selected, the higher tensions allow a relatively large tolerance in the magnitudes of the propagating fields.

Figure 6:
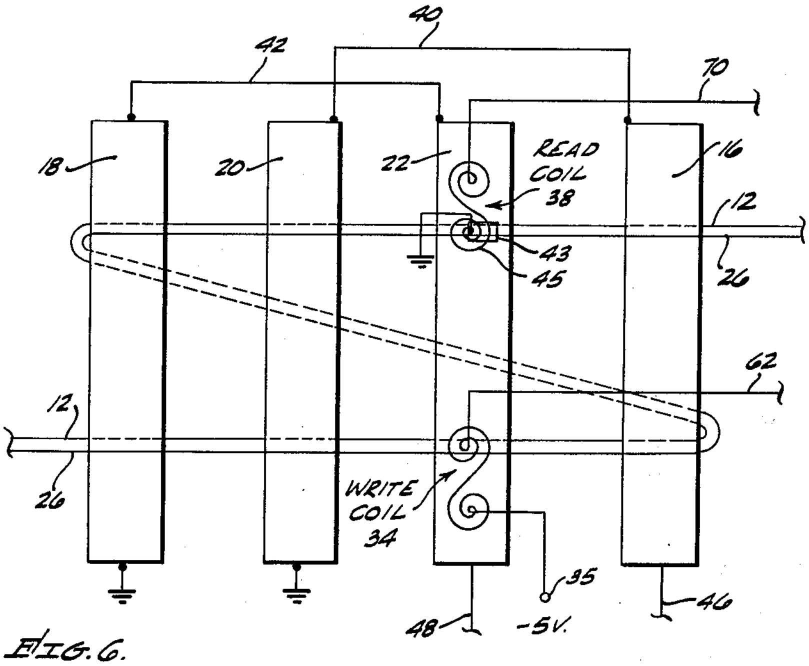
FIG. 6 is a schematic diagram for further explaining the polyphase conductors and the read and write coils in accordance with this invention.

In the system in accordance with this invention utilizing a pair of first and second magnetic wires 12 and 26 for each shift register channel, the recording is performed by establishing domains of opposite polarity in the adjacent first and second wires and sensing is performed by responding to the polarity of the domains in the two wires. A write coil 34 which may include two spirally wound segments as may also be seen in FIG. 6 has one segment positioned on the external side of the polyphase conductor 16 and under the magnetic wire 26. The other spirally wound segment which is wound in the opposite direction from the first segment to provide cancellation of the polyphase driving fields is mounted on the same conductor 16 but substantially removed from the magnetic wires 12 and 16. Also, a similar read coil 38 substantially at the opposite end of the wire 26 may be placed on the polyphase conductor such as 16 and underneath the magnetic wire 26. The pitch of the helix formed by wires 26 and 12 may be increased at the ends to provide space for the second winding of the write coil 34 and the read coil 38. It is to be noted that the write coil 34 may be a single spiral as interference is not a problem at the write coil. It is also to be noted at this time that a magnet 43 as shown in FIG. 6 may be positioned over half of the read coil 38 to provide erasing and prevent undesired sense signals from being formed as will be explained subsequently.

In the driving arrangement utilizing four polyphase conductors to provide a continuous circular driving field, the conductors 16 and 20 and the conductors 22 and 18 are respectively coupled together through leads 40 and 42 at one end. At the other end, the conductors 20 and 18 may be coupled to ground and the conductors 16 and 22 may be coupled through respective leads 46 and 48 to a driving circuit 50. A clock 54 may provide timing to the system through a lead 56 to the driving circuit 50 and through a lead 58 to a write circuit 60 which is coupled to the write coil 34 through a lead 62, the other end of the coil being coupled to a −5 volt terminal 35. Information may be applied from a source of information 64 through a lead 66 to the write circuit 60 with the source of information being timed by the clock 54. A read circuit 68 is coupled to the read coil 38 through a lead 70, the other end of the coil being coupled to ground. Signals representing interrogated information are applied through a lead 74 to the source of information 64, for example. Also, asynchronous pulses may be utilized in place of the clock pulses to accommodate systems having an intermittent flow of information.

Figure 3:
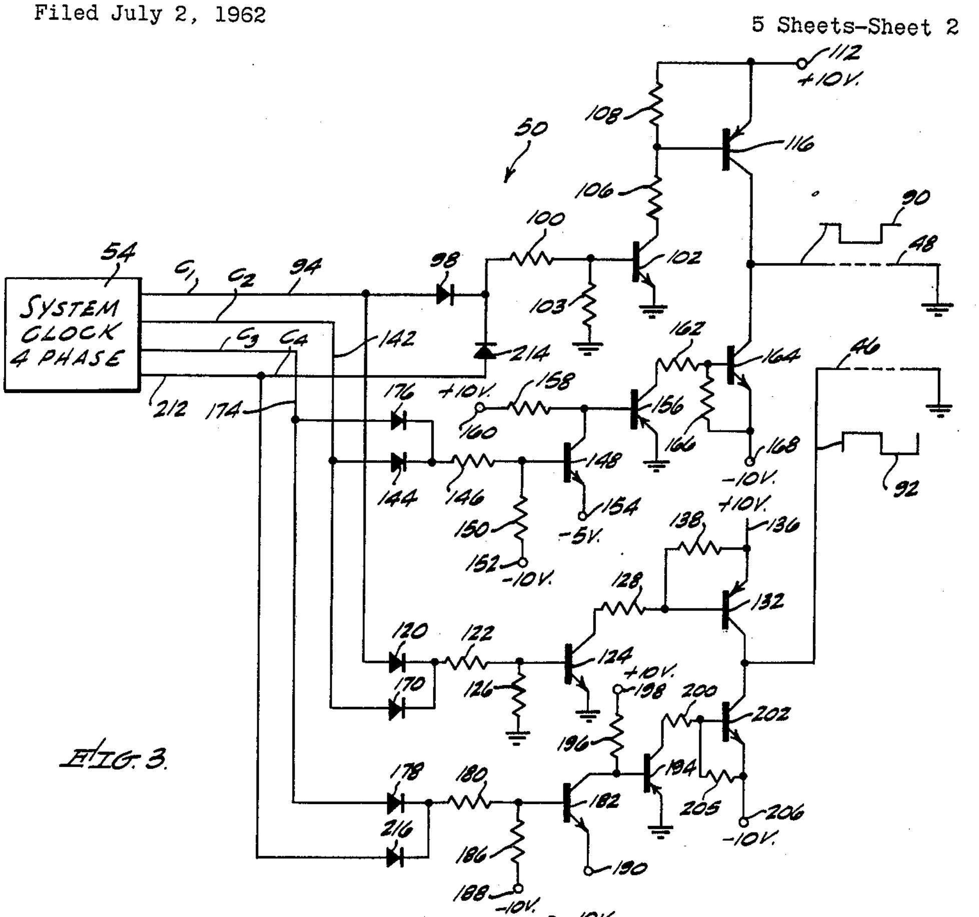
FIG. 3 is a schematic circuit diagram of the two phase armature driving circuit utilized in the system of FIG. 1.

The driving circuit 50 of FIG. 3 responds to the clock 54 which has a four period timing sequence for controlling the driving arrangement of the invention. As may be seen in FIG. 8, the clock 54 provides clock signals $C_1$, $C_2$, $C_3$, and $C_4$ of waveforms 80, 82, 84 and 86 having pulses at respective times $T_1$, $T_2$, $T_3$ and $T_4$. In response to these clock pulses the driving circuit 50 applies driving current signals of waveforms 90 and 92 to respective leads 48 and 46 which as will be explained subsequently provides the continuous driving fields around the cylinder 10 of FIG. 1. The first clock signal $C_1$ is applied through a lead 94, through the anode to cathode paths of a diode 98, and through a resistor 100 to the base of an npn type transistor 102. The base of the transistor 102 is also coupled to ground through a resistor 103, the emitter is coupled directly to ground, and the collector is coupled through series coupled resistors 106 and 108 to a +10 volt terminal 112. The signal is applied from between the resistors 106 and 108 to the base of a pnp type transistor 116 of which the emitter is coupled to the terminal 112 and the collector is coupled to the conductor 48. The clock signal $C_1$ is also applied from the lead 94 through the anode to cathode path of a diode 120 and through a resistor 122 to the base of an npn type transistor 124. The base of the transistor 124 is coupled to ground through a biasing resistor 126, the emitter is coupled to ground and the collector is coupled through a resistor 128 to the base of a pnp type transistor 132. A suitable source of potential such as a +10 volt terminal 136 is coupled to the emitter of the transistor 132 and through a resistor 138 to the base thereof. The collector of the transistor 132 applies a signal to the conductor 46.

A second clock signal $C_2$ of the waveform 82 (FIG. 8) is applied from a lead 142 through the anode to cathode path of a diode 144 and through a resistor 146 to the base of an npn type transistor 148. The base of the transistor 148 is coupled through a resistor 150 to a −10 volt terminal 152, the emitter is coupled to a −5 volt terminal 154, and the collector is coupled to the base of a pnp type transistor 156. The base of the transistor 156 is aslo coupled through a resistor 158 to a +10 volt terminal 160, the emitter is coupled to ground and the collector is coupled through a resistor 162 to the base of an npn type transistor 164. The base of the transistor 164 is also coupled through a resistor 166 to a −10 volt terminal 168, the emitter is coupled to the terminal 168 and the collector applies a signal to the conductor 48. The clock signal $C_2$ is also applied from the lead 142 through the anode to cathode path of a diode 170 to the resistor 122 and the transistor 124.

A clock signal $C_3$ of the waveform 84 (FIG. 8) is applied from a lead 174 through the anode to cathode path of a diode 176 and to the resistor 146 and the transistor 148. The clock signal $C_3$ is also applied from the lead 174 through the anode to cathode path of a diode 178 and through a resistor 180 to the base of an npn type transistor 182. The base of the transistor 182 is also coupled through a biasing resistor 186 to a −10 volt terminal 188, the emitter is coupled to a −5 volt terminal 190, and the collector is coupled to the base of a pnp type transistor 194. The base of the transistor 194 is also coupled through a biasing resistor 196 to a +10 volt terminal 198, the emitter is coupled to ground and the collector is coupled through a resistor 200 to the base of an npn type transistor 202. The base of the transistor 202 is also coupled through a resistor 205 to a −10 volt terminal 206, the emitter is coupled to the terminal 206, and the collector applies a signal to the conductor 46.

The clock signal $C_4$ of the waveform 86 (FIG. 8) is applied from a lead 212 through the anode to cathode path of a diode 214 to the resistor 100 and the transistor 102. Also, the clock pulse $C_4$ is applied from the lead 212 through the anode to cathode path of a diode 216 and to the resistor 180 and the transistor 182.

In operation the transistors of FIG. 3 are non-conductive except in response to specific clock pulses. At time $T_1$ the transistor 102 and in turn the transistor 116 are biased into conduction to develop the positive current pulse of the waveform 90. At the same time, the transistor 124 and in turn the transistor 132 are biased into conduction to apply the positive current pulse of the waveform 92 to the conductor 46. At time $T_2$ in response to the clock signal $C_2$ of the waveform 82 (FIG. 8), the transistor 148 and in turn the transistors 156 and 164 are biased into conduction to apply a negative voltage pulse to the conductor 48 as shown by the negative current pulse of the waveform 90. Also, at time $T_2$ the transistor 124 and in turn the transistor 132 are maintained in conduction to continue the positive voltage pulse applied to the conductor 46 indicated by the positive current pulse of the waveform 92.

At time $T_3$ the clock signal $C_3$ of the waveform 84 maintains the transistor 148 and in turn the transistors 156 and 164 biased in conduction. Thus, the negative pulse indicated by the current pulse of the waveform 90 is applied to the conductor 48. At the same time, the transistors 182, 194 and 202 are biased into conduction to apply the negative voltage pulse to the conductor 46 as indicated by the current pulse of the waveform 92. At time $T_4$ the clock signal $C_4$ biases the transistor 102 and in turn the transistor 116 into conduction to apply a positive voltage pulse to the conductor 48 indicated by the current pulse of the waveform 90. Also, at time $T_4$ the clock signal $C_4$ is applied through the diode 216 to maintain the transistors 182, 194 and 202 biased in conduction so that the negative current pulse of the waveform 92 is maintained. The current pulses of the waveforms 90 and 92 are continually applied to the conductors 22 and 16 of FIG. 1 to provide the polyphase driving operation. The operation of the circuit of FIG. 3 continues in a similar manner through other cycles such as $T_1'$ to $T_4'$ and will not be explained in further detail.

Figure 4:
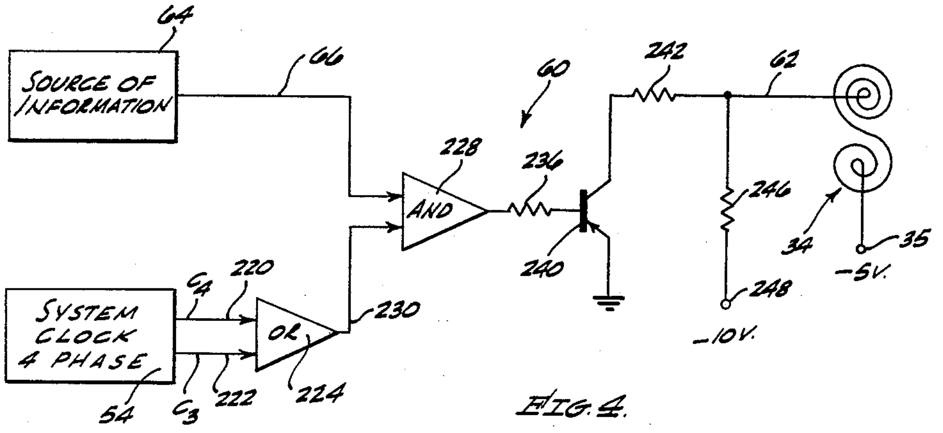
FIG. 4 is a schematic circuit diagram of the record circuit utilized in the system of FIG. 1.

The record or write circuit 60 as shown in FIG. 4 responds to signals applied both from the source of information 64 and from the four phase clock 54. The clock signals $C_3$ and $C_4$ of the waveforms 84 and 86 (FIG. 8) are applied through leads 220 and 222 of the composite lead 58 of FIG. 1 to an "or" gate 224. An "and" gate 228 responds to clock pulses applied from the "or" gate 224 through a lead 230 and to binary informational pulses applied from the source of information 64 through the lead 66. The output signal of the "and" gate 228 is applied through a resistor 236 to the base of a pnp type transistor 240. The emitter of the transistor 240 is coupled to ground and the collector is coupled through a resistor 242 to the lead 62, which in turn is coupled to one end of the record coil 34, the other end of the coil being coupled to the —5 volt terminal 35. The lead 62 is also coupled through a resistor 246 to a —10 volt terminal 248 to provide a current through the coil 34 flowing in the opposite direction from the current flowing through the transistor 240.

Figure 8:
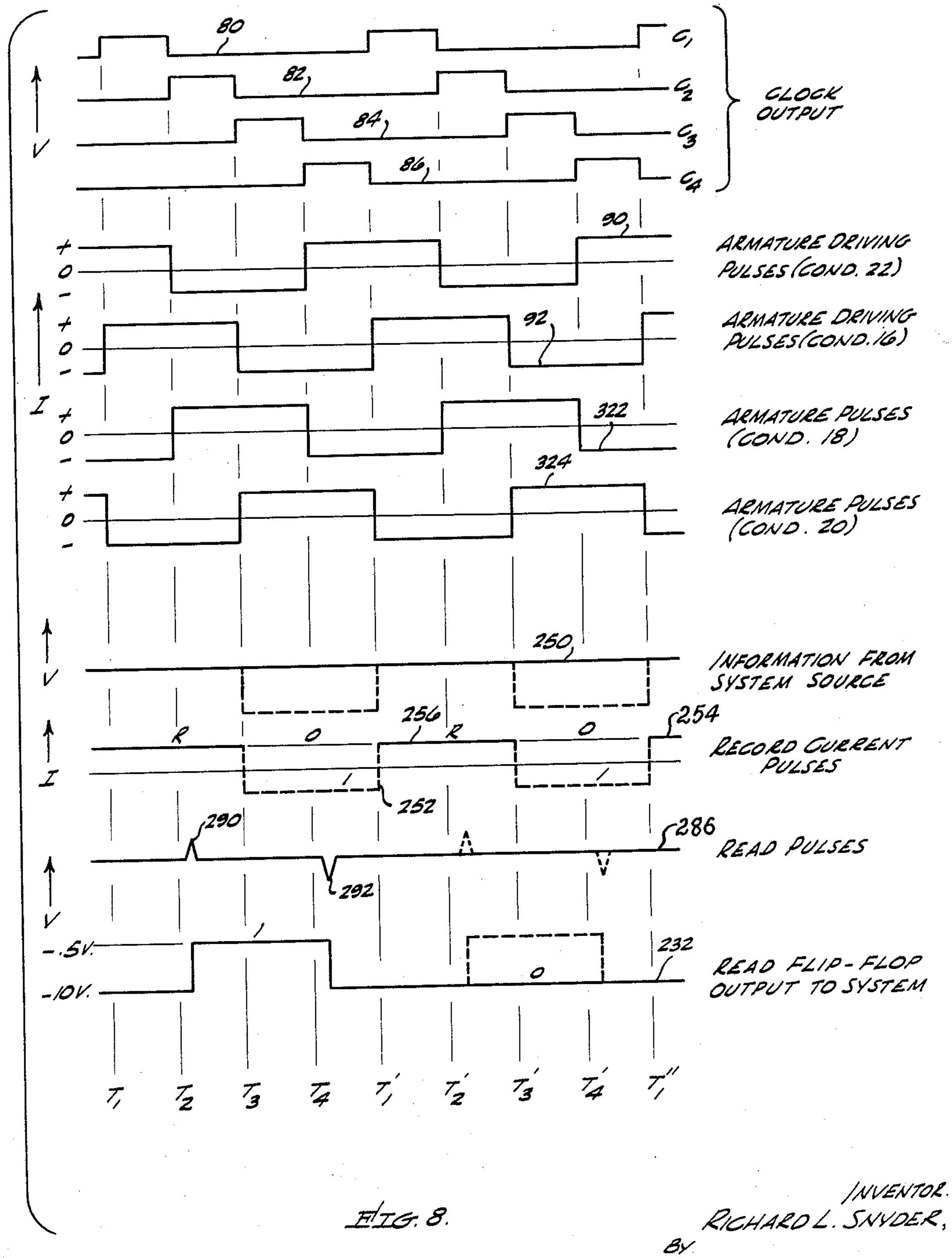
FIG. 8 is a diagram of waveforms for further explaining the operation of the system of FIG. 1 in accordance with this invention.

For writing a binary bit into the combined wire 27 of FIG. 1, an information signal as shown by a waveform 250 of FIG. 8 is applied on the lead 66 to the "and" gate 228. The clock pulses $C_3$ and $C_4$ are also applied to the "and" gate 228. Thus, during the coincidence of the clock pulses and information pulses at times $T_3$ and $T_4$, that is, between times $T_3$ and $T_1'$, a negative information signal may be applied to the base of the transistor 240 and current as shown by a waveform 254 flows in a first direction through the record coil 34. For representing the binary information, a binary zero is selected as the upper voltage level of the waveform 250 and a binary "one" is selected as the lower voltage level of the waveform 250. Between times $T_3$ and $T_1'$, a voltage level of the waveform 250 representing a zero prevents a signal from passing through the "and" gate 228 maintaining the transistor 240 non-conductive, and current of the waveform 254 flows in the "zero" direction through the coil 34 from the terminal 35 to the terminal 248.

Between times $T_3$ and $T_1'$, a voltage level representing a "one" coincides with the clock pulses $C_3$, or $C_4$, passing a negative pulse through the "and" gate 228 to bias the transistor 240 into conduction. Thus, a record current pulse such as level 252 of the waveform 254 of FIG. 8 passes through the record coil 34 in the direction to establish a magnetic domain of a predetermined polarity representing a binary "one" in the combined wires 27 of FIG. 1. The magnetic domains in the wires 12 and 26 which are alternately a digit domain of a selected magnetic polarity and a reference domain of a fixed polarity are shown by respective arrows 300 and 304 of FIG. 7.

Thus, the normal current flowing from the terminal 35 to the terminal 248 at a current level 256 of the waveform 254 establishes a magnetic domain of the polarity that is selected to represent a binary "zero" state in the wires 12 and 26. During a portion of the four cycle sequence of operation, a magnetic domain of a reference R polarity is recorded on the wires 12 and 26 having the same magnetic orientation or polarity as a "zero." Thus, during periods starting with times $T_1$ and $T_2$ of FIG. 8 when clock pulses $C_1$ and $C_2$ are applied to the driving circuit 50, the current level and direction as shown by the waveform 254 is maintained through the coil 34 so that a reference domain is established in the combined wire 27. It is to be noted that the current levels of the waveform 254 are selected to rapidly establish magnetic states in the wires 12 and 26 and to overcome the propagation field thereat. Also, the driving currents of the waveforms 90 and 92 are selected of a level so that the driving fields developed do not affect the magnetic orientations established during writing. Currents are selected for the waveforms such as 90 and 92 to develop translating fields of 4 to 8 oersteds for example. The writing current of the waveform 254 is selected to produce a total magnetomotive force of over 20 to 35 oersteds for example to overcome the translating field at the write coil 34.

Figure 5:
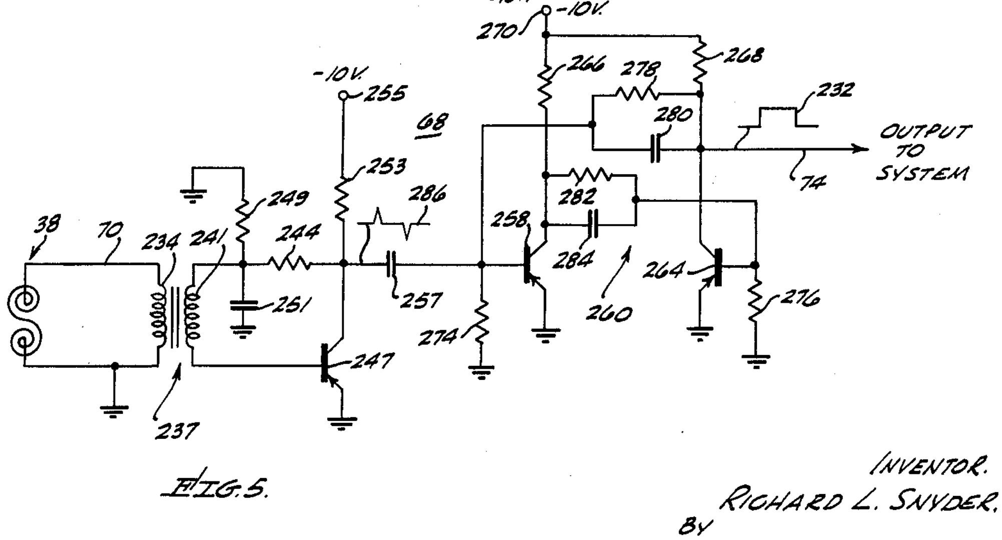
FIG. 5 is a schematic circuit diagram of the read circuit utilized in the system of FIG. 1.

Referring now to FIG. 5, the read circuit 68 responds to signals induced in the coil 38 by propagation of the magnetic domains (FIG. 7) to apply output pulses of a waveform 232 to the lead 74 representing binary information stored and propagated through both of the magnetic wires 12 and 26. The coil 38 which may have one end coupled to ground is coupled to a first winding 234 of a transformer 237 through the lead 70. A second winding 241 of the transformer 237 has one end coupled through a resistor 244 to the collector of a pnp type transistor 247 and has the other end coupled to the base of the transistor 247. Also, the winding 241 is coupled to ground through a biasing resistor 249 and to ground througs a bypass capacitor 251. The emitter of the transistor 247 is coupled to ground and the collector is coupled through a resistor 253 to a —10 volt terminal 255.

The signal developed on the collector of the transistor 247 is applied through a coupling capacitor 257 to the base of a pnp type transistor 258 of a flip flop 260. The flip flop 260 also includes a pnp type transistor 264 with the emitters of the transistors 258 and 264 coupled to ground and the collectors coupled through respective resistors 266 and 268 to a —10 volt terminal 270. The bases of the transistors 258 and 264 are coupled to ground through respective resistors 274 and 276. The base of the transistor 258 is also coupled to the collector of the transistor 264 through a control circuit including parallel coupled resistor 278 and a capacitor 280. In a similar manner, the base of the transistor 264 is coupled to the collector of the transistor 258 by a suitable control circuit including a parallel coupled resistor 282 and capacitor 284.

The output binary signal of the waveform 232 is derived from the collector of the transistor 264 and applied through the lead 74 to the source of information system 64 of FIG. 1, for example.

Figure 7:
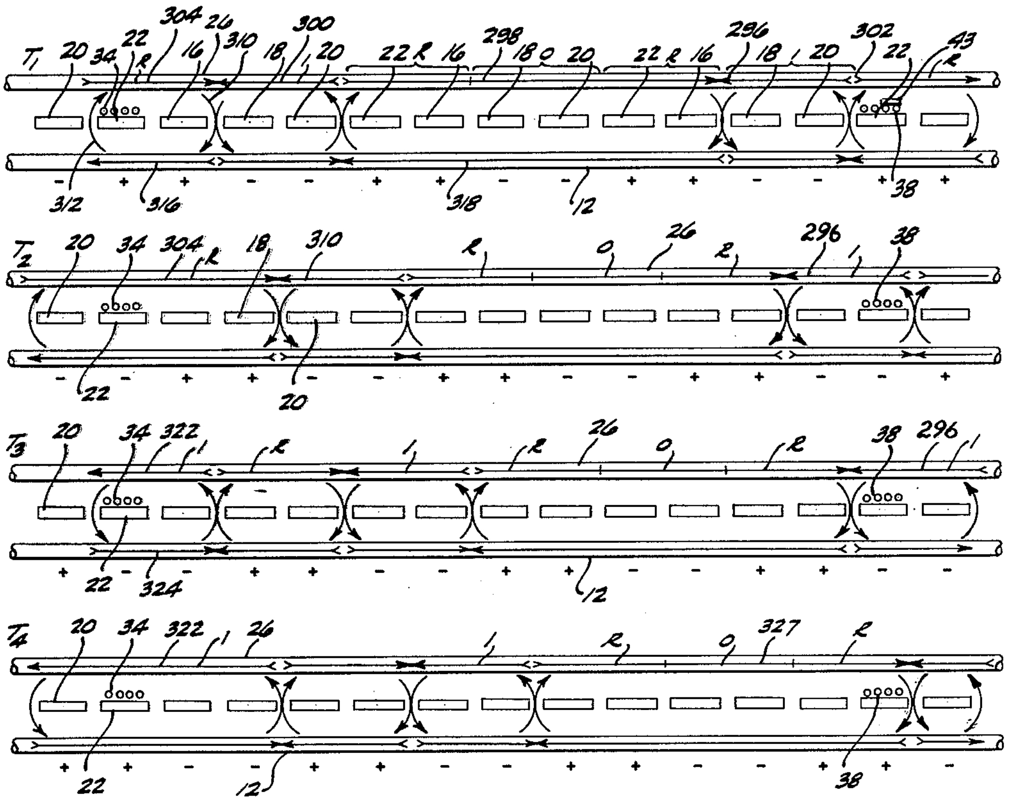
FIG. 7 is a schematic diagram showing the complementary magnetic domains during a propagation sequence.

In operation, as the magnetic domains in the wires 12 and 26 as shown in FIG. 7 are propagated to a position adjacent to the read head 38, informational signals of a waveform 286 of FIG. 8 are derived therefrom. A "zero" may be selected as the absence of an output signal at the read coil 38 and a "one" may be sensed by a sequential positive and negative pulse as shown by the waveform 286 of FIG. 8. Thus, during a "zero" condition or the absence of a signal at the coil 38, the transistor 258 is conductive and the transistor 264 is non-conductive, so that a −10 volt level of the waveform 232 is applied to the lead 74. When a "one" condition is being interpreted and a positive pulse such as 290 is sensed by the coil 38, the flip flop 260 changes state so that the transistor 258 is biased out of conduction and the transistor 264 is biased into conduction. Thus, a pulse of the waveform 232 at a level of approximately −0.5 volt is applied to the lead 74 indicating an interrogated "one." At the occurrence of a negative pulse 292 of the waveform 286, the flip flop 260 changes back to its original reset state with the transistor 264 non-conductive an the transistor 258 biased into conduction to again apply a binary "zero" voltage level of −10 volts to the lead 74.

Depending on the speed of propagation of the magnetic domains (FIG. 7) along the wires 12 and 26, the pulses 290 and 292 of FIG. 8 are sensed a short time subsequent to times $T_2$ and $T_4$ or corresponding times of other four cycle sequences. Also, it is to be noted that the time of occurrence of the output pulses 290 and 292 is dependent upon the position of the read coil 38 relative to the conductors which position may be selected to provide other timing arrangement in accordance with the principles of this invention.

Referring now to FIG. 6, which shows the polyphase conductors removed from the cylinder 10, the current of the driving pulses applied to the conductors 16 and 22 returns to ground through respective conductors 20 and 18 in the opposite direction. Thus, for example, a positive current pulse applied to the conductor 16 is a negative current pulse through the conductor 20 as shown by a waveform 324 of FIG. 8, and a negative current pulse applied to the conductor 22 is a positive current pulse when flowing through the conductor 18 as shown by a waveform 322 (FIG. 8). Because of the permanent magnet 43 positioned over the last half of a spiral 45 of the read coil 38 when propagating domains to the end of the wires 26 and 12, an arbitrarily selected magnetic polarity is provided at the center of the spiral 45 adjacent to the wires 26 and 12. Thus, domain walls between the adjacent magnetic domains do not move past the edge of the spiral 45 adjacent to the end of the wire to form pulses of undesired polarity. The pulses of the waveform 286 are formed at the edge of the spiral 45 to the left in FIG. 6 with the magnetic domains being propagated from left to right at that segment of the wires 12 and 26. Also, in accordance with the principles of this invention, the erasing action of the magnet 43 may be performed by an erase wire passing through the center of the spiral 45 with D.C. (direct current) flowing through the erase wire.

Referring now to FIGS. 7 and 8, a sequence of the conductor currents through various segments of the conductors 22, 16, 18 and 20 is shown shortly after times $T_1$, $T_2$, $T_3$ and $T_4$ of the four cycle sequence. Because the magnetic wires 12 and 26 are helically wound, the four conductors 22, 16, 18 and 20 effectively repeat to apply continuous propagating fields to the magnetic wires. The segments of the conductors are shown in FIG. 7 so that the direction of propagation of the magnetic domains from the write coil 34 to the read coil 38 is from left to right through the wires 26 and 12 for convenience of explanation. Thus, because of the helical winding of the wires 12 and 26, the four polyphase conductors 22, 16, 18 and 20 are effectively repetitive as shown by the cross sections thereof. The input coil 34 and the output coil 38 are placed adjacent to the magnetic wire 26 of the external helix, for example. During writing, complementary magnetic domains of opposite polarity are established in the two wires 26 and 12. In the example shown, a binary "101" has been recorded in the wire 26 as shown by the arrows 296, 298 and 300 shortly after time $T_1$. The polarity for a "zero" has been selected with the arrow to the right and the polarity for a "one" has been selected with the arrow to the left in the wire 26. A reference domain shown by arrows 302 and 304 is of the same polarity as the "zero." In the wire 12, the complementary domains are indicated by oppositely directed arrows. Considering the view presented in FIG. 7, it may be convenient to designate a "zero" and a reference "R" as having a clockwise magnetic polarity and a "one" as having a counterclockwise magnetic polarity. It is to be noted that the arrow 298 includes two reference portions and a "zero" portion because a magnetic domain expands to a domain of opposite polarity. Each magnetic domain such as the reference domain shown by the arrow 304 and the complementary domain of the arrow 316 has an essentially closed magnetic path shown by arrows 310 and 312 through the magnetic wires 26 and 12 so that the field is effectively retained. Also, the polarity established in the wire 12 for an expanded domain as shown by an arrow 318 is opposite to that of the arrow 298 to form an essentially closed magnetic path.

At time $T_1$ the polarity of the driving current of the waveforms 90 and 92 of FIG. 8 in the conductors 22 and 16 is positive and the polarity of the driving current in the conductors 18 and 20 is negative as shown by the waveforms 322 and 324 representing the current flowing in those conductors. At time $T_1$ in response to the record current of the waveform 254, a reference domain of the arrow 304 is established in the wire 26, as well as the domain of opposite polarity of the arrow 316 in the wire 12, as all of the domains are propagated forward one conductor segment width from the previous condition. The writing field is of a substantially larger magnitude than the propagating field so that the domains are established in the wires 26 and 12 regardless of the direction of the propagating field at the write coil 34. Because the other domains are propagated forward, the domain established by the write coil 34 expands with the propagation and is effectively propagated with the other domains in the wires.

At time $T_2$ as shown by the waveforms 90, 92, 322 and 324, the driving current polarities of the conductors 22, 16, 18 and 20 are respectively − + + − and in response to the record current of the waveform 254 the reference domain of the arrow 304 is further recorded in the wire 26. Each magnetic domain in the wire 26 is again propagated one conductor width forward so that each arrow head or tail, for example, is between two conductors of opposite polarity such as the arrows 304 and 310 between the conductors 18 and 20. The domain wall of the "one" domain of the arrow 296 is propagated past the read coil 38 so that the positive signal 290 of the waveform 286 is sensed by the read coil to trigger the flip flop 260 of FIG. 5 to a "one" state and apply the pulse of the waveform 232 to the source of information 64. It is to be noted that the permanent magnet 43 prevents an opposite polarity pulse from being formed at the right hand portion of the spiral 45.

At time $T_3$ in response to the driving pulses of the waveforms 90, 92, 322 and 324, the conductors 22, 16, 18 and 20 have respectively − − + + current polarity applied thereto. Thus, the magnetic domains are propagated one conductor width forward. In response to the record current pulse of the waveform 254 at the level 252 for writing a "one," a magnetic domain shown by an arrow 322 is established in the wire 26 with the corresponding complementary domain in the wire 12 as shown by an arrow 324, both of which are effectively propagated forward to a position between the conductors 22 and 16. It is to be noted that shortly after time $T_3$, the binary "one" magnetic domain of the arrow 296 has ben propagated forward so that the domain wall is between the conductors 20 and 22, the read coil 38 being adjacent to the conductor 22. Because of the erasing action of the permanent magnet 43, the polarity to the right of the read coil 38 is always the same so that a signal is not sensed by a domain wall moving to the right of the spiral 45.

At time $T_4$ in response to the armature driving pulses of the waveforms 90, 92, 322 and 324, the current polarity of the conductors 22, 16, 18 and 20 is respectively $+ - - +$ and the magnetic domains are again propagated one conductor width forward to the right so that each domain wall represented by either two arrow heads or two arrow tails is between propagating fields of opposite polarity. Also, at time $T_4$ the current pulse at the level 252 of the waveform 254 for writing a "one" continues and the "one" domain 322 is further expanded. Shortly after time $T_4$, the "one" domain of the arrow 296 is propagated over the coil 38 so that the negative signal 292 of the waveform 286 is sensed thereby and applied to the read circuit 68 to reset the flip flop 260 to the "zero" state as shown by the waveform 232.

The operation continues in a similar manner propagating the domain walls one conductor width forward during each time period with the binary "zero" of an arrow 327 passing over the coil 38 shortly after time $T_2'$ but not developing a pulse of the waveform 286 because a domain wall is not present between a "zero" domain and a reference domain. Thus, the flip flop 260 remains in the "zero" state and the output signal of the waveform 232 remains at the lower or "zero" level. Also, it is to be noted that as shown by the waveform 286, a signal is not formed at time $T_4'$ for an interrogated "zero" and the flip flop 260 remains in the reset state. Because the operation proceeds in a similar manner as that discussed above, it will not be explained in further detail.

In accordance with the principles of this invention utilizing one mil diameter wire and a domain length of ¼ inch, the pitch of the magnetic wire helix can be more than 64 per inch, while with a single wire, the pitch can be only 11 per inch. The double wire arrangement in accordance with this invention not only allows close spacing of the magnetic wires in the helix, but the domains are relatively immune to destruction from external magnetic fields.

The reduction of the reluctance in the magnetic path by the use of the two magnetic wires and relatively thin propagation conductors reduces the magnetomotive force required to support the magnetic domains. Thus, in accordance with this invention, the width of the propagating conductors may be reduced to make the domain length relatively small. Therefore, a relatively large density of storage and rate of handling information are provided.

An advantage of increasing the density of storage along the magnetic wires not only requires a minimum space in the array but also reduces the power requirements of a system of a given size because the amount of material of the polyphase conductor array required per binary bit is reduced in proportion to the spacing between the magnetic wires or the pitch of the helix. It is to be noted that the diameter of the helix established by the diameter of the cylinder 10 of FIG. 1 may be made relatively large by including a large number of conductors of a multiple of four. In accordance with the principles of this invention, the domain width is predetermined by the width of the conductors and may be carried out by selecting either a small cylinder 10 or a large number of conductors. The magnetic wires utilized in the system in accordance with this invention may be any desirable magnetic material such as nickel-iron wires.

Thus, there has been described a shift register memory system utilizing two magnetic wires for each shift register channel so that there is little or no external field emanating therefrom. The arrangement in accordance with this invention allows relatively close spacing of the pairs of magnetic wirse and allows utilizing relatively short magnetic domains. Therefore, a highly reliable shift register system is provided which accommodates a relatively large bit packing density.

What is claimed is:

1. A magnetic shift register storage device comprising first and second elongated magnetic elements, means for simultaneously establishing complementary magnetic domains in said first and second magnetic elements to provide an essentially closed magnetic path between said first and second magnetic elements, and means for shifting said complementary magnetic domains along said first and second magnetic elements.

2. A magnetic shift register storage device comprising first and second magnetic wires positioned adjacent and substantially parallel to each other, polyphase driving means positioned between said first and second magnetic wires, input means positioned between said first and second magnetic wires for simultaneously establishing magnetic domains in said first and second magnetic wires, and output means positioned between said first and second magnetic wires for responding to the magnetic domains in said first and second wires propagated through said wires to said output means by said polyphase driving means.

3. A magnetic storage system comprising first and second magnetic mediums positioned substantially parallel to each other, polyphase driving means positioned between said first and second magnetic mediums for applying polyphase driving fields thereto, recording means positioned between said first and second magnetic mediums substantially at first ends thereof for recording magnetic informational domains of opposite polarity relations in said first and second magnetic mediums, and reading means positioned between said first and second magnetic mediums substantially at second ends thereof for sensing said magnetic informational domains propagated to said reading means by said polyphase driving fields.

4. A magnetic shift register storage system comprising first and second elongated mediums of a magnetic material having characteristics for being magnetized with magnetic domains of selected polarities and with said magnetic domains propagating along said mediums in response to a polyphase driving field, said first and second mediums positioned substantially adjacent to each other, polyphase driving means positioned between said first and second mediums for applying said polyphase driving field thereto, recording means positioned at first ends of said first and second mediums for alternately establishing magnetic domains in said first medium of a first polarity and of a selected first or second polarity and for simultaneously establishing magnetic domains in said second medium having opposite polarity relations from said domains in said first medium to provide essentially closed magnetic paths to magnetic lines of flux of the domains in said first and second mediums, and sensing means positioned at a second end of said first and second mediums for responding to the polarity of the magnetic domains propagated through said mediums.

5. A shift register storage channel comprising first and second magnetic wires positioned substantially parallel to each other, input means positioned between said first and second wires for establishing magnetic domains therein of selected polarities to provide essentially closed magnetic paths through said first and second wires, output means positioned between said first and second wires for responding to the selected polarities of said magnetic domains when propagated past said output means, and means positioned between said first and second wires for applying polyphase driving fields to said first and second wires to propagate the magnetic domains therethrough from said input means to said output means.

6. A magnetic shift register system comprising a first magnetic wire positioned substantially in a helix around a mounting structure, polyphase driving conductors mounted external to said first magnetic wire for providing a polyphase driving field, a second magnetic wire positioned substantially in a helix around said polyphase driving conductors and substantially parallel to said first magnetic wire, said first and second magnetic wires being maintained under sufficient tension to have characteristics so that magnetic domains propagate therethrough in response to said polyphase driving field, recording means including a recording coil positioned between said first and second wires substantially at first ends thereof for alternately establishing magnetic information domains and reference domains in said first wire and domains of opposite magnetic polarities in said second magnetic wire, and reading means including a read coil positioned between said first and second wires substantially at second ends thereof for sensing the polarity of the magnetic informational domains propagated adjacent to said read coil.

7. A magnetic shift register storage system comprising first and second wires having magnetic characteristics and positioned substantially adjacent to each other, means positioned substantially at first and second ends of said first and second wires for maintaining said wires under a tension so as to have characteristics to allow magnetic domains to be propagated therethrough in response to a polyphase driving field, first and second polyphase conductor means positioned between said first and second wires substantially at right angles thereto with one alternately leading and lagging the other, a source of first and second driving signals respectively coupled to said first and second polyphase conductor means for developing said polyphase driving field to provide a propagating force from the first ends to the second ends of said wires, a source of timing signals coupled to said source of first and second driving signals, a write coil positioned between said first and second wires substantially at the first ends thereof, a read coil positioned between said first and second wires substantially at the second ends thereof, a source of write current coupled to said source of timing signals and to said read coil for alternately, in sequence with said polyphase driving fields, applying current in a first direction and in a selected first or second direction therethrough to respectively establish reference domains and informational domains in said first wire and domains of opposite polarities in said second wire, said domains in said first and second wires being propagated from the first ends to the second ends in response ot said polyphase driving fields, and read amplifier means coupled to said read coil for responding to the polarity of said informational domains propagated adjacent to said read coil, the corresponding domains of opposite polarities in said first and second wires providing essentially closed magnetic paths to magnetic fields thereof.

8. A magnetic storage system comprising a cylindrical mounting structure, an internal helix of first magnetic wire wound around said mounting structure, a plurality of polyphase conductor strips positioned external and adjacent to said internal helix substantially parallel to the longitudinal axis of said cylindrical mounting structure, said conductor strips coupled together to form first and second current paths for providing polyphase driving fields substantially parallel to said internal helix, an external helix of second magnetic wire wound around said polyphase conductor strips in a substantially coincident position external to said internal helix, retaining means attached to first and second ends of said first and second magnetic wires for maintaining said wires under a tension to provide characteristics to allow propagation of magnetic domains therethrough, a write coil positioned between said first and second wires substantially at the first ends thereof, a read coil positioned between said first and second wires substantially at the second ends thereof, a source of timing pulses, a source of first and second driving pulses coupled to said source of timing pulses and to said polyphase conductor strips for respectively applying said first and second driving pulses through said first and second current paths to provide said polyphase driving fields for propagating magnetic domains through said first and second wires from the first to second ends thereof, a source of writing pulses coupled to said timing means and to said write coil for alternately establishing magnetic reference domains of a first polarity and informational domains of a selected first or second polarity in said first wire and for simultaneously establishing magnetic domainsn of opposite polarities in said second magnetic wire, said magnetic domains being established in sequence with said polyphase driving fields, and a read circuit including a read amplifier coupled to said read coil and a flip flop coupled to said read amplifier for responding to the polarity of the informational domains propagated past said read coil to trigger said flip flop to first or second states.

No references cited.